United States Patent
Tang et al.

(10) Patent No.: US 11,395,302 B2
(45) Date of Patent: Jul. 19, 2022

(54) RESOURCE REPORTING METHOD, TERMINAL DEVICE, AND NETWORK DEVICE

(71) Applicant: GUANGDONG OPPO MOBILE TELECOMMUNICATIONS CORP., LTD., Dongguan (CN)

(72) Inventors: Hai Tang, Dongguan (CN); Huei-Ming Lin, Victoria (AU)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 0 days.

(21) Appl. No.: 16/992,997

(22) Filed: Aug. 13, 2020

(65) Prior Publication Data
US 2020/0374865 A1 Nov. 26, 2020

Related U.S. Application Data

(63) Continuation of application No. PCT/CN2018/100532, filed on Aug. 14, 2018.

(30) Foreign Application Priority Data

Feb. 14, 2018 (WO) ................ PCT/CN2018/076866
May 30, 2018 (WO) ................ PCT/CN2018/089060

(51) Int. Cl.
*H04W 72/04* (2009.01)
*H04W 72/02* (2009.01)

(52) U.S. Cl.
CPC ......... *H04W 72/048* (2013.01); *H04W 72/02* (2013.01); *H04W 72/0413* (2013.01)

(58) Field of Classification Search
CPC ......... H04W 72/1278; H04W 72/0446; H04W 72/0453; H04W 92/18; H04W 4/40; Y02D 30/70
See application file for complete search history.

(56) References Cited

U.S. PATENT DOCUMENTS

2011/0230223 A1* 9/2011 Lu .................. H04W 72/042
455/509
2012/0033561 A1* 2/2012 Kawamura ........... H04L 1/1628
370/252
(Continued)

FOREIGN PATENT DOCUMENTS

CN       103702346 A     4/2014
CN       104113851 A     10/2014
(Continued)

OTHER PUBLICATIONS

"Discussion on resource pool sharing for eV2X", Source: Huawei, HiSilicon, Agenda Item: 6.2.3.4, 3GPP TSG RAN WG1 Meeting #91, R1-1719509, Reno, USA, Nov. 27-Dec. 1, 2017, 3 pages.
(Continued)

*Primary Examiner* — Jay P Patel
(74) *Attorney, Agent, or Firm* — Bayes PLLC

(57) ABSTRACT

Embodiments of the present disclosure provide a resource reporting method, a terminal device, and a network device. The terminal device may select a resource to listen to and select a resource to report. In addition, the resource listening approach and the resource reporting approach can be flexibly determined. Therefore, the communication requirements of Release 15 or higher releases can be satisfied. The method includes a terminal device reports to a network device the measurement result of a first wireless time-frequency resource used for terminal-to-terminal communication. The terminal device is a terminal device supporting a network scheduling mode of a terminal-to-terminal communication resource.

16 Claims, 4 Drawing Sheets

(56) References Cited

U.S. PATENT DOCUMENTS

| | | | |
|---|---|---|---|
| 2014/0314049 A1* | 10/2014 | Cho | H04L 5/0032 370/332 |
| 2015/0173113 A1* | 6/2015 | Liu | H04W 8/005 370/329 |
| 2015/0189574 A1* | 7/2015 | Ng | H04W 24/08 370/254 |
| 2015/0358981 A1* | 12/2015 | Chae | H04L 25/02 370/252 |
| 2016/0088617 A1* | 3/2016 | Goldhamer | H04W 72/04 370/330 |
| 2016/0100355 A1* | 4/2016 | Chen | H04W 48/16 370/232 |
| 2016/0226645 A1* | 8/2016 | Kim | H04W 72/0413 |
| 2016/0227373 A1* | 8/2016 | Tsai | G01S 5/0284 |
| 2016/0249311 A1* | 8/2016 | Yu | H04W 4/70 |
| 2016/0338052 A1* | 11/2016 | Ji | H04L 1/12 |
| 2017/0006653 A1* | 1/2017 | Zeng | H04W 76/14 |
| 2017/0126338 A1* | 5/2017 | Zaidi | H04B 17/318 |
| 2017/0163392 A1* | 6/2017 | Lim | H04L 5/0032 |
| 2017/0188252 A1* | 6/2017 | Miao | H04W 24/10 |
| 2017/0188391 A1* | 6/2017 | Rajagopal | H04W 74/0816 |
| 2017/0295601 A1* | 10/2017 | Kim | H04L 5/0092 |
| 2017/0325214 A1* | 11/2017 | Lu | H04W 76/14 |
| 2018/0014317 A1* | 1/2018 | Gulati | H04L 5/0005 |
| 2018/0054750 A1* | 2/2018 | Lee | G01S 5/00 |
| 2018/0131498 A1* | 5/2018 | Chen | H04L 27/2613 |
| 2018/0192406 A1* | 7/2018 | Tang | H04W 72/1263 |
| 2018/0205528 A1* | 7/2018 | Bai | H04L 27/2688 |
| 2018/0227783 A1 | 8/2018 | Shen et al. | |
| 2018/0262311 A1* | 9/2018 | Wang | H04L 5/0055 |
| 2018/0359620 A1* | 12/2018 | Zhao | H04W 4/46 |
| 2019/0021019 A1 | 1/2019 | Seo et al. | |
| 2019/0037513 A1* | 1/2019 | Yang | G01S 19/24 |
| 2019/0149365 A1* | 5/2019 | Chatterjee | H04L 25/0226 370/329 |
| 2019/0173646 A1* | 6/2019 | Wu | H04L 25/0224 |
| 2019/0174278 A1* | 6/2019 | Fujishiro | H04W 72/02 |
| 2019/0208504 A1* | 7/2019 | Yasukawa | H04W 24/10 |
| 2019/0239264 A1* | 8/2019 | Hahn | H04W 72/042 |
| 2019/0260544 A1* | 8/2019 | Dou | H04L 5/0091 |
| 2019/0313345 A1* | 10/2019 | Jiang | H04W 76/27 |
| 2019/0357154 A1* | 11/2019 | Zeng | H04W 52/245 |
| 2019/0357190 A1* | 11/2019 | Park | H04L 27/0006 |
| 2019/0364492 A1* | 11/2019 | Azizi | H04W 48/16 |
| 2019/0387425 A1* | 12/2019 | Seo | H04W 72/048 |
| 2019/0394786 A1* | 12/2019 | Parron | H04L 27/0006 |
| 2020/0008247 A1* | 1/2020 | Kwak | H04B 7/0695 |
| 2020/0022117 A1* | 1/2020 | Dong | H04W 72/0453 |
| 2020/0059847 A1* | 2/2020 | Lin | H04W 24/10 |
| 2020/0112944 A1* | 4/2020 | Jiang | H04W 72/042 |
| 2020/0119894 A1* | 4/2020 | Jia | H04L 5/0092 |
| 2020/0120651 A1* | 4/2020 | Ma | H04L 1/0061 |
| 2020/0137538 A1* | 4/2020 | Chen | H04W 76/14 |
| 2020/0153586 A1* | 5/2020 | Bai | H04W 72/12 |
| 2020/0177353 A1* | 6/2020 | Ding | H04L 5/0094 |
| 2020/0178217 A1* | 6/2020 | Huang | H04W 80/02 |
| 2020/0195407 A1* | 6/2020 | Du | H04W 72/0453 |
| 2020/0213989 A1* | 7/2020 | Choi | H04L 5/00 |
| 2020/0236518 A1* | 7/2020 | Lee | H04W 72/0493 |
| 2020/0296678 A1* | 9/2020 | Zhang | H04W 56/0015 |
| 2020/0383088 A1* | 12/2020 | Min | H04W 72/02 |
| 2021/0045088 A1* | 2/2021 | Cai | H04W 72/0473 |

FOREIGN PATENT DOCUMENTS

| | | | |
|---|---|---|---|
| CN | 104144437 A | 11/2014 | |
| CN | 104185183 A | 12/2014 | |
| CN | 104284340 A | 1/2015 | |
| CN | 104902579 A | 9/2015 | |
| CN | 105009654 A | 10/2015 | |
| CN | 105636205 A | 6/2016 | |
| CN | 107371247 A | 11/2017 | |
| KR | 20170088490 A * | 8/2017 | H04W 56/0015 |
| WO | 2014121493 A1 | 8/2014 | |
| WO | 2017024986 A1 | 2/2017 | |
| WO | 2017029036 A1 | 2/2017 | |
| WO | 2017122949 A1 | 7/2017 | |
| WO | WO-2018069311 A1 * | 4/2018 | H04B 17/382 |
| WO | WO-2018113947 A1 * | 6/2018 | H04W 40/12 |
| WO | WO-2018125686 A2 * | 7/2018 | H04W 52/0261 |
| WO | 2019157726 A1 | 8/2019 | |
| WO | 2019157789 A1 | 8/2019 | |
| WO | 2019157801 A1 | 8/2019 | |

OTHER PUBLICATIONS

"Consideration s for resource pool sharing between mode 3 and mode 4", Source: ZTE, Sanechips. Agenda item: 6.2.3.4, 3GPP TSG RAN WG1 Meeting #91, R1-1719659, Reno, USA, Nov. 27-Dec. 1, 2017, 4 pages.

"Discussion on Resource Pool Sharing for eNB-Controlled and UE-Autonomous in V2V Communication", Source: ITRI, Agenda Item: 6.2.3.4, 3GPP TSG RAN WG1 Meeting 91, R1-1719681, Reno, USA, Nov. 27-Dec. 1, 2017, 3 pages.

"Discussion on resource pool sharing between mode 3 and mode 4", Source: CATT, Agenda Item: 6.2.3.4, 3GPP TSG RAN WG1 Meeting #91, R1-1720163, Reno, USA, Nov. 27-Dec. 1, 2017, 4 pages.

Supplementary European Search Report issued in corresponding European Application No. EP 18 90 6551, dated Dec. 11, 2020, 8 pages.

Communication Pursuant to Article 94(3) EPC issued in corresponding European Application No. 18906551.9, dated Sep. 22, 2021, 7 pages.

First Office action issued in corresponding India Application No. 202027035710, dated Sep. 1, 2021, 5 pages.

First Office Action issued in corresponding Taiwanese Application No. 108104786, dated may 6, 2022, 11 pages.

* cited by examiner

300 — S310 The network device receives a measurement result of the first wireless time-frequency resource reported by the terminal device for terminal-to-terminal communication, where the terminal device is a terminal device that supports a network scheduling a terminal-to-terminal communication resource mode S320 The network device schedules the wireless time-frequency resource used by the terminal device for terminal-to-terminal communication according to the measurement result

FIG.3

RESOURCE REPORTING METHOD, TERMINAL DEVICE, AND NETWORK DEVICE

CROSS-REFERENCE TO RELATED APPLICATIONS

This application is a continuation of International Application No. PCT/CN2018/100532, filed on Aug. 14, 2018, which claims the benefit of priorities to International Application No. PCT/CN2018/076866, filed on Feb. 14, 2018, and International Application No. PCT/CN2018/089060, filed on May 30, 2018, all of which are hereby incorporated by reference in their entireties.

BACKGROUND

The present disclosure relates to the field of communications, and more specifically, to a method for reporting a resource, a terminal device, and a network device.

In Release 14, the transmission resources of the terminal device (for example, a vehicle-mounted terminal) are allocated by the network device (for example, a base station), and the terminal device performs terminal-to-terminal communication on side links according to the resources allocated by a network device. The network device can allocate the resource for a single transmission to the terminal device, and can also allocate the resource for a semi-static transmission to the terminal device. In Release 15 and later communications, higher requirements are imposed on the resource sensing and resource reporting of the terminal device. The resource sensing and resource reporting of the terminal device in Release 14 cannot adapt to the requirements of Release 15 and later communication.

SUMMARY

The embodiments of the present disclosure provide a method for reporting a resource, a terminal device, and a network device. The terminal device can select a resource for sensing, and select a resource for reporting. At the same time, the terminal device can flexibly determine a resource sensing method and a method for reporting a resource, thereby meeting requirements of Release 15 and the later communication.

In a first aspect, the embodiments of the present disclosure provide a method for reporting a resource, including reporting, by a terminal device, a measurement result of a first wireless time-frequency resource used for terminal-to-terminal communication to a network device, wherein the terminal device is a terminal device that supports a network to schedule terminal-to-terminal communication resource mode.

Therefore, in the method for reporting a resource in the embodiment of the present disclosure, the terminal device can report the measurement result of the first wireless time-frequency resource used for terminal-to-terminal communication, thereby assisting the network device in resource scheduling.

In a second aspect, the embodiments of the present disclosure provide a method for reporting a resource, including receiving, by a network device, a measurement result of a first wireless time-frequency resource for terminal-to-terminal communication reported by a terminal device, where the terminal device is a terminal device that supports a network scheduled terminal-to-terminal communication resource mode; and scheduling, by the network device, a wireless time-frequency resource used by the terminal device for terminal-to-terminal communication according to the measurement result.

Therefore, in the method for reporting a resource in the embodiments of the present disclosure, the terminal device can report the measurement result of the first wireless time-frequency resource used for terminal-to-terminal communication, thereby assisting the network device in resource scheduling.

In a third aspect, the embodiments of the present disclosure provide a terminal device that can execute modules or units in the method in the first aspect or any optional implementation manner of the first aspect.

In a fourth aspect, the embodiments of the present disclosure provide a network device that can execute modules or units in the method in the second aspect or any optional implementation manner of the second aspect.

In a fifth aspect, there is provided a terminal device. The terminal device includes a processor, a memory, and a communication interface. The processor is connected to the memory and communication interface. The memory is configured to store instructions, the processor is configured to execute the instructions, and the communication interface is configured to communicate with other network elements under the control of the processor. When the processor executes the instructions stored in the memory, the execution causes the processor to execute the method in the first aspect or any possible implementation manner of the first aspect.

In a sixth aspect, there is provided a network device. The network device includes a processor, a memory, and a communication interface. The processor is connected to the memory and the communication interface. The memory is configured to store instructions, the processor is configured to execute the instructions, and the communication interface is configured to communicate with other network elements under the control of the processor. When the processor executes the instructions stored in the memory, the execution causes the processor to execute the method in the second aspect or any possible implementation manner of the second aspect.

In a seventh aspect, there is provided a chip for implementing the method in any one of the foregoing first to fourth aspects or in implementation manners thereof.

Specifically, the chip includes a processor for invoking and running a computer program from a memory, so that a device installed with the chip executes the method in any one of the first to second aspects described above or in implementation manners thereof.

In an eighth aspect, there is provided a computer-readable storage medium for storing a computer program, which causes a computer to execute the method in any one of the first to second aspects described above or in implementation manners thereof.

In a ninth aspect, there is provided a computer program product, including computer program instructions that cause a computer to execute the method in any one of the first to second aspects described above or in implementation manners thereof.

In a tenth aspect, there is provided a computer program that, when run on a computer, causes the computer to execute the method in any one of the first to second aspects described above or in implementation manners thereof.

BRIEF DESCRIPTION OF THE DRAWINGS

FIG. 3 is a schematic flowchart of another method for reporting a resource according to an embodiment of the present disclosure.

DETAILED DESCRIPTION

The technical solutions in the embodiments of the present disclosure will be clearly and completely described below with reference to the accompanying drawings in the embodiments of the present disclosure.

It should be understood that the technical solutions in the embodiments of the present disclosure can be applied to an end-to-end (Device to Device, D2D) communication system, for example, Internet of Vehicles system that performs D2D communication based on Long Term Evolution (LTE). Different from the way that communication data between terminals in conventional LTE systems is received or sent by network devices (for example, base stations), the Internet of Vehicles system uses direct terminal-to-terminal communication, so it has higher spectrum efficiency and lower transmission delay.

Optionally, the communication system on which the Internet of Vehicles system is based may be a Global System of Mobile communication (GSM) system, a Code Division Multiple Access (CDMA) system, a Wideband Code Division Multiple Access (WCDMA) system, General Packet Radio Service (GPRS), an LTE system, an LTE Frequency Division Duplex (FDD) system, LTE Time Division Duplex (TDD), a Universal Mobile Telecommunication System (UMTS), a Worldwide Interoperability for Microwave Access (WiMAX) communication system, a 5G New Radio (NR) system, etc.

The terminal device in the embodiments of the present disclosure may be a terminal device capable of implementing D2D communication. For example, the terminal device may be a vehicle-mounted terminal device, a terminal device in a 5G network, or a terminal device in an evolved Public Land Mobile Network (PLMN) in the future, which is not limited by the embodiments of the present disclosure.

Figure 1:
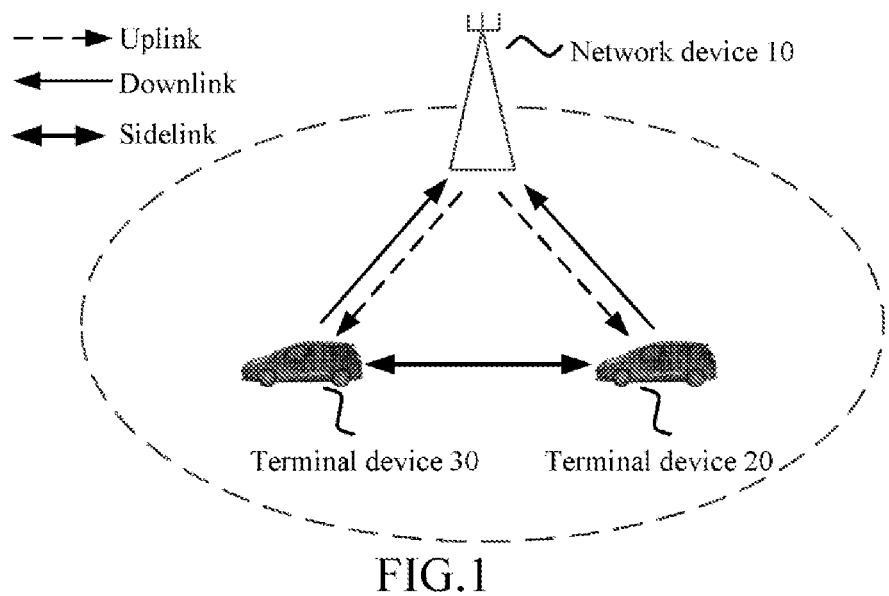
FIG. 1 is a schematic diagram of an application scenario according to an embodiment of the present disclosure.

FIG. 1 is a schematic diagram of an application scenario according to an embodiment of the present disclosure. FIG. 1 exemplarily shows one network device and two terminal devices. Optionally, the wireless communication system in the embodiments of the present disclosure may include a plurality of network devices, and a coverage range of each network device may include other numbers of the terminal devices, which is not limited in the embodiments of the present disclosure.

Optionally, the wireless communication system may further include other network entities such as a Mobile Management Entity (MME), a Serving Gateway (S-GW), and a Packet Data Network Gateway (P-GW), or the wireless communication system may further include other network entities such as Session Management Function (SMF), Unified Data Management (UDM), and Authentication Server Function (AUSF), which is not limited by the embodiments of the present disclosure.

Specifically, the terminal device 20 and the terminal device 30 can communicate through a D2D communication mode. During the D2D communication, the terminal device 20 and the terminal device 30 directly communicate through a D2D link, that is, a side link (Sidelink, SL). For example, as shown in FIG. 1, the terminal device 20, and the terminal device 30 communicate directly through the sidelink. In FIG. 1, the terminal device 20 and the terminal device 30 communicate through a sidelink, and the transmission resource thereof is allocated by the network device.

The D2D communication can refer to vehicle-to-vehicle (V2V) communication or vehicle-to-everything (V2X) communication. In V2X communication, X can refer to any device with wireless receiving and transmitting capabilities, such as but not limited to a slow-moving wireless apparatus, a fast-moving vehicle-mounted device, or a network control node with wireless transmitting and receiving capabilities. It should be understood that the embodiments of the present disclosure are mainly applied to the scenario of V2X communication but can also be applied to any other D2D communication scenario, which is not limited in the embodiments of the present disclosure.

In the Internet of Vehicles system, there may be two types of terminal devices, that is, the terminal devices with sensing capabilities such as Vehicle User Equipment (VUE) or Pedestrian User Equipment (PUE), and the terminal devices without sensing capabilities such as PUE. VUE has a higher processing power and is usually powered by the battery in the vehicle. PUE has lower processing power, and reducing power consumption is also a major factor that PUE needs to consider. Therefore, in the existing Internet of Vehicles system, VUE is considered to have full receiving and sensing capabilities, while PUE is considered to have partial or no receiving and sensing capabilities. If the PUE has part of the sensing capability, its resource can be selected using a sensing method similar to the VUE, and the available resources are selected on the part of the resources that can be sensed; if the PUE does not have the sensing capability, the PUE randomly selects transmission resources in a resource pool.

In addition, various aspects or features of the present disclosure may be implemented as a method, apparatus, or article of manufacture using standard programming and/or engineering techniques. The term "article of manufacture" as used in this application encompasses a computer program accessible from any computer-readable device, carrier, or medium. For example, the computer-readable medium may include, but is not limited to: a magnetic storage device (e.g., a hard disk, a floppy disk, or a magnetic tape, etc.), an optical disk (e.g., Compact Disc (CD), Digital Versatile Disc (DVD), etc.), a smart card and a flash memory device (e.g., an Erasable Programmable Read-Only Memory (EPROM), a card, a stick or a key drive, etc.). In addition, the various storage media described herein may represent one or more devices and/or other machine-readable media used to store information. The term "machine-readable medium" may include, but is not limited to, various media capable of storing, containing, and/or carrying instruction(s) and/or data.

It should be understood that the terms "system" and "network" are often used interchangeably herein. The term "and/or" in the present disclosure is only used to describe an association relationship of related objects, which means that there can be three kinds of relationships, for example, A and/or B can mean the following three cases: A exists alone, A and B exist simultaneously, and B exists alone. In addition, the character "I" in the present disclosure generally indicates that the related objects are an "or" relationship.

Figure 2:
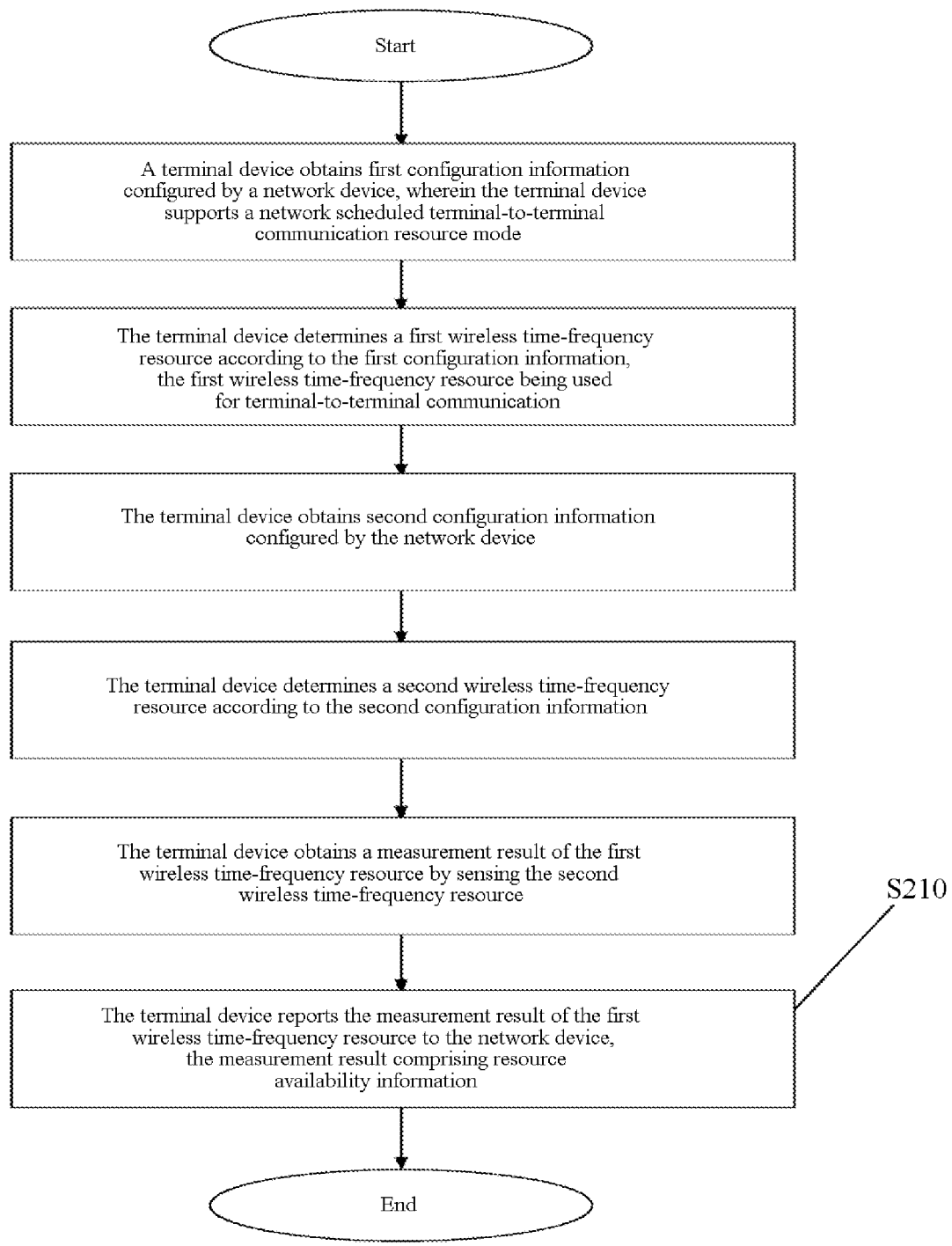
FIG. 2 is a schematic flowchart of a method for reporting a resource according to an embodiment of the present disclosure.

FIG. 2 is a schematic flowchart of a method 200 for reporting a resource according to an embodiment of the present disclosure. The method 200 may optionally be applied to the system shown in FIG. 1, but is not limited thereto. The method 200 includes at least part of the following content.

In S210, the terminal device reports a measurement result of a first wireless time-frequency resource used for terminal-to-terminal communication to the network device, where the terminal device is a terminal device that supports a network scheduling a terminal-to-terminal communication resource mode.

Optionally, the measurement result is carried in at least one of a Radio Resource Control (RRC) signaling, a Media Access Control Element (MAC CE), a Buffer Status Report (BSR), a Physical Uplink Control Channel (PUCCH).

Optionally, the measurement result includes at least one of the following information about the first time-frequency resource: time-frequency location information; resource availability information; Reference Signal Receiving Power (RSRP) information; Received Signal Strength Indication (RSSI) information; Reference Signal Reception Quality (RSRQ) information.

Optionally, the terminal device determines the first wireless time-frequency resource according to first configuration information configured by the network device.

For example, the terminal device receives first configuration information sent by the network device and determines the first wireless time-frequency resource according to the first configuration information.

Optionally, the first configuration information is used to indicate a time position or range of a wireless time-frequency resource to be reported by the terminal device; and/or is used to indicate a frequency position or width of the wireless time-frequency resource to be reported by the terminal device; and/or, is used to indicate the number of wireless time-frequency resources to be reported by the terminal device.

Optionally, the first configuration information includes a first index, where the first index is used to indicate a time position or range of the wireless time-frequency resource to be reported by the terminal device.

Specifically, before receiving the first configuration information, the terminal device reports the wireless time-frequency resources that can be reported and corresponding index information. At this time, the network device can directly indicate to the terminal device the time position or range of the wireless time-frequency resource to be reported through the index information.

For example, the wireless time-frequency resources available for reporting reported by the terminal device include index A, corresponding to a wireless time-frequency resource 1; index B, corresponding to a wireless time-frequency resource 2; and index C, corresponding to a wireless time-frequency resource 3. At this time, the network device may indicate the terminal device to report the time position or range of the wireless time-frequency resource 2 through index B.

Optionally, the first index may be an implicit Semi-Persistent Scheduling (SPS) index.

Optionally, the terminal device may determine the first wireless time-frequency resource by itself.

For example, the terminal device determines the first wireless time-frequency resource according to a target service.

Further, the terminal device determines the first wireless time-frequency resource according to a period and a time offset of a target service.

Specifically, the terminal device determines a time position or range of the first wireless time-frequency resource; and/or, the terminal device determines a frequency position or width of the first wireless time-frequency resource; and/or, the terminal device determines the number of the first wireless time-frequency resource.

Optionally, the terminal device may obtain the measurement result by sensing a second wireless time-frequency resource.

Optionally, the range of the second wireless time-frequency resource is greater than or equal to the range of the first wireless time-frequency resource.

Optionally, the terminal device determines the second wireless time-frequency resource according to second configuration information configured by the network device.

For example, the terminal device receives the second configuration information sent by the network device and determines the second wireless time-frequency resource according to the second configuration information.

Optionally, the second configuration information is used to indicate a time position or range of a wireless time-frequency resource to be sensed by the terminal device; and/or is used to indicate a frequency position or width of the wireless time-frequency resource to be sensed by the terminal device; and/or is used to indicate the number of the wireless time-frequency resource(s) to be sensed by the terminal device.

Optionally, the second configuration information is further used to indicate a repetition period for the terminal device to sensing the wireless time-frequency resource; and/or is also used to indicate a repetition number for the terminal device to sense the wireless time-frequency resource.

For example, a terminal device senses the wireless time-frequency resources with a period of 10 ms (milliseconds), and its repetition period can be configured as 1 min (minutes), that is, the terminal device senses the wireless time-frequency resources with a period of 10 ms within 1 min, and stops sensing when exceeding 1 min.

For another example, the terminal device senses the wireless time-frequency resource with a period of 10 ms, and the repetition number can be configured as 5, that is, the terminal device stops sensing as long as the wireless time-frequency resource has been continuously sensed 5 times.

As another example, the terminal device senses the wireless time-frequency resource, and the repetition number can be configured as 5, that is, the terminal device stops sensing as long as the wireless time-frequency resource has been continuously sensed 5 times. In other words, the terminal device may sense the wireless time-frequency resources periodically.

Optionally, the second configuration information includes a second index, where the second index is used to indicate a time position or range of the wireless time-frequency resource to be sensed by the terminal device.

It should be understood that, for the second index, reference may be made to the related description of the foregoing first index, which will not be repeated here for brevity.

Optionally, the terminal device determines the second wireless time-frequency resource.

For example, the terminal device determines the second wireless time-frequency resource according to a target service.

Further, the terminal device determines the second wireless time-frequency resource according to a period and a time offset of the target service.

Specifically, the terminal device determines a time position or range of the second wireless time-frequency resource; and/or, the terminal device determines a frequency position or width of the second wireless time-frequency resource; and/or the terminal device determines the number of the second wireless time-frequency resources.

Specifically, the terminal device determines a repetition period of the second wireless time-frequency resource; and/or the terminal device determines a repetition number of the second wireless time-frequency resource.

Specifically, the terminal device can sense the second wireless time-frequency resource and obtain the measurement result in the following manner.

First Manner

The terminal device periodically senses the second wireless time-frequency resource to obtain the measurement result.

Optionally, the sensing period is configured by the network device.

Optionally, the sensing period is determined by the terminal device. For example, the sensing period is determined by the terminal device according to the target service.

Second Manner

If the attribute of the target resource changes, the terminal device senses the second wireless time-frequency resource to obtain the measurement result.

Optionally, the target resource is the first wireless time-frequency resource.

Optionally, the target resource is a wireless time-frequency resource sensed by the terminal device when obtaining the measurement report.

Third Manner

If the network device schedules the terminal device to sense the wireless time-frequency resource, the terminal device senses the second wireless time-frequency resource and obtains the measurement result.

Fourth Manner

If the random counter times out, the terminal device senses the second wireless time-frequency resource and obtains the measurement result.

Fifth Manner

If the attribute of the service changes, the terminal device senses the second wireless time-frequency resource and obtains the measurement result.

Specifically, the change of the attribute of the service includes: a new service to be transmitted; and/or at least one of the period, time offset, packet size, and priority of the existing service is changed; and/or the existing service ends.

Specifically, the terminal device may report the measurement result of the first wireless time-frequency resource to the network device in the following manner.

First Manner

The terminal device reports the measurement result of the first wireless time-frequency resource to the network device periodically.

Optionally, the reporting period is configured by the network device.

Optionally, the reporting period is determined by the terminal device. For example, the reporting period is determined by the terminal device according to the target service.

Second Manner

If the attribute of the target resource changes, the terminal device reports the measurement result of the first wireless time-frequency resource to the network device.

Optionally, the target resource is the first wireless time-frequency resource.

Optionally, the target resource is a wireless time-frequency resource sensed by the terminal device when obtaining the measurement report.

Third Manner

If the network device schedules the terminal device to report the wireless time-frequency resource, the terminal device reports the measurement result of the first wireless time-frequency resource to the network device.

Fourth Manner

If the random counter times out, the terminal device reports the measurement result of the first wireless time-frequency resource to the network device.

Specifically, the change of the attribute of the target resource can be characterized as follows.

First Manner

The RSSI of the target resource changes, or the RSRP of the target resource changes, or the RSRQ of the target resource changes, or the occupation of the target resource by another terminal device changes.

Second Manner

The quantity of resources that meet a first quality requirement in the target resource changes. The first quality requirement is the RSSI of the target resource, or the RSRP of the target resource, or the RSRQ of the target resource, or whether the target resource is occupied by another terminal device meets a first threshold.

Third Manner

The first configuration information has changed, where the first configuration information is used to indicate a time position or range of the wireless time-frequency resource to be reported by the terminal device; and/or is used to indicate a frequency position or width of the wireless time-frequency resource to be reported by the terminal device; and/or is used to indicate the number of the wireless time-frequency resources to be reported by the terminal device.

Fourth Manner

The second configuration information has changed, where the second configuration information is used to indicate a time position or range of the wireless time-frequency resource to be sensed by the terminal device; and/or, is used to indicate a frequency position or width of the wireless time-frequency resource to be sensed by the terminal device; and/or is used to indicate the amount of wireless time-frequency resources to be sensed by the terminal device.

Optionally, the second configuration information is further used to indicate a repetition period of the wireless time-frequency resource to be sensed by the terminal device; and/or is also used to indicate a repetition number of the wireless time-frequency resource to be sensed by the terminal device.

Fifth Manner

The network device disables or deactivates a transmission resource that has been configured for the terminal device; or the network device configures a new transmission resource for the terminal device.

Therefore, in the method for reporting a resource provided in the embodiments of the present disclosure, the terminal device can select a resource for sensing, and select a resource for reporting. At the same time, it can flexibly determine a resource sensing method and a resource reporting method, thereby satisfying requirements of Release 15 and later communications with higher versions.

FIG. 3 is a schematic flowchart of a method 300 for reporting a resource according to an embodiment of the present disclosure. The method 300 can be optionally applied to the system shown in FIG. 1, but is not limited thereto. The method 300 includes at least a part of the following content.

In S310, the network device receives a measurement result of the first wireless time-frequency resource reported by the terminal device for terminal-to-terminal communication, where the terminal device is a terminal device that supports a network scheduling a terminal-to-terminal communication resource mode.

Optionally, the measurement result is carried in at least one of RRC signaling, MAC CE, BSR, and physical uplink control channel.

Optionally, the measurement result includes at least one of the following information about the first time-frequency resource:

time-frequency location information; resource availability information; RSRP information; RSSI information; RSRQ information.

Specifically, the first wireless time-frequency resource is determined by the terminal device according to a period and a time offset of a target service.

In S320, the network device schedules the wireless time-frequency resource used by the terminal device for terminal-to-terminal communication according to the measurement result.

Optionally, before the network device receives the measurement result reported by the terminal device, the method further includes the network device sending first configuration information to the terminal device, where the first configuration information is configured to indicate a time position or range of a wireless time-frequency resource to be reported by the terminal device; and/or is configured to indicate a frequency position or width of the wireless time-frequency resource to be reported by the terminal device; and/or is configured to indicate the number of the wireless time-frequency resources to be reported by the terminal device.

Optionally, the first configuration information includes a first index, where the first index is used to indicate a time position or range of the wireless time-frequency resource to be reported by the terminal device.

Optionally, the measurement result is obtained by the terminal device by sensing a second wireless time-frequency resource.

Specifically, the second wireless time-frequency resource is determined by the terminal device according to a period and a time offset of a target service.

Optionally, before the network device receives the measurement result reported by the terminal device, the method further includes the network device sending second configuration information to the terminal device, where the second configuration information is configured to indicate the time position or range of the wireless time-frequency resource to be sensed by the terminal device; and/or is configured to indicate a frequency position or width of the wireless time-frequency resource to be sensed by the terminal device; and/or is configured to indicate a quantity of the wireless time-frequency resource to be sensed by the terminal device.

Optionally, before the network device receives the measurement result reported by the terminal device, the method further includes the network device sending second configuration information to the terminal device, where the second configuration information is configured to indicate a repetition period of sensing the wireless time-frequency resource by the terminal device; and/or is configured to indicate a repetition number of sensing the wireless time-frequency resource by the terminal device.

Optionally, the second configuration information includes a second index, where the second index is configured to indicate a time position or range of the wireless time-frequency resource to be sensed by the terminal device.

Specifically, the network device may receive the measurement result reported by the terminal device in the following manner.

First Manner

The network device periodically receives the measurement result reported by the terminal device.

Optionally, the reporting period is configured by the network device.

Optionally, the reporting period is determined by the terminal device. For example, the reporting period is determined by the terminal device according to the target service.

Second Manner

If the attribute of the target resource changes, the network device receives the measurement result reported by the terminal device.

Optionally, the target resource is the first wireless time-frequency resource.

Optionally, the target resource is a wireless time-frequency resource sensed by the terminal device when obtaining the measurement report.

Third Manner

If the network device schedules the terminal device to report the wireless time-frequency resource, the network device receives the measurement result reported by the terminal device.

Fourth Manner

If the random counter times out, the network device receives the measurement result reported by the terminal device.

Fifth Manner

If the attribute of the service changes, the network device receives the measurement result reported by the terminal device.

Specifically, the change of the attribute of the service includes: a new service is to be transmitted; and/or at least one of the period, time offset, packet size, and priority of the existing service is changed; and/or the existing service ends.

Specifically, the change of the attribute of the target resource may be represented in the following manner.

First Manner

The RSSI of the target resource changes, or the RSRP of the target resource changes, or the RSRQ of the target resource changes, or the occupation of the target resource by another terminal device changes.

Second Manner

The amount of resources that meet the first quality requirement in the target resource changes.

Optionally, the first quality requirement is the RSSI of the target resource, or the RSRP of the target resource, or the RSRQ of the target resource, or whether the target resource is occupied by another terminal device meets the first threshold.

Third Manner

The first configuration information changes, where the first configuration information is configured to indicate the time position or range of the wireless time-frequency resource to be reported by the terminal device; and/or is configured to indicate the frequency position or width of the wireless time-frequency resource to be reported by the terminal device; and/or, is configured to indicate the number of wireless time-frequency resources to be reported by the terminal device.

Fourth Manner

The second configuration information is changed, and the second configuration information is configured to indicate the time position or range of the wireless time-frequency resource to be sensed by the terminal device; and/or is configured to indicate a frequency position or width of a wireless time-frequency resource to be sensed by the terminal device; and/or is configured to indicate a quantity of the wireless time-frequency resource to be sensed by the terminal device.

Optionally, the second configuration information is further configured to indicate a repetition period for sensing the wireless time-frequency resource by the terminal device; and/or is also configured to indicate a repetition number for sensing the wireless time-frequency resource by the terminal device.

Fifth Manner

The network device disables or deactivates a transmission resource that has been configured for the terminal device; or the network device configures a new transmission resource for the terminal device.

Therefore, in the method for reporting a resource provided by the embodiments of the present disclosure, the network device configures the resource to be sensed and the resource to be reported, so that the terminal device can select the resource for sensing and the resource for reporting, and at the same time, it can flexibly determine the resource sensing method and the resource reporting method, thereby meeting the requirements of Release 15 and later communication.

Figure 4:
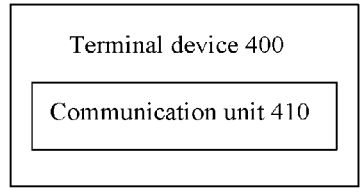
FIG. 4 is a schematic block diagram of a terminal device according to an embodiment of the present disclosure.

FIG. 4 is a schematic block diagram of a terminal device 400 according to an embodiment of the present disclosure. The terminal device 400 includes a communication unit 410 configured to report a measurement result of a first wireless time-frequency resource used for terminal-to-terminal communication to a network device, where the terminal device is a terminal device supporting a network scheduling a terminal-to-terminal communication resource mode.

Optionally, before the communication unit 410 reports the measurement result of the first wireless time-frequency resource to the network device, the terminal device 400 further includes a processing unit configured to determine the first wireless time-frequency resource according to first configuration information configured by the network device.

Optionally, the first configuration information is configured to indicate a time position or range of a wireless time-frequency resource to be reported by the terminal device; and/or is configured to indicate a frequency position or width of the wireless time-frequency resource to be reported by the terminal device; and/or is configured to indicate the number of the wireless time-frequency resource to be reported by the terminal device.

Optionally, the first configuration information includes a first index, where the first index is configured to indicate a time position or range of the wireless time-frequency resource to be reported by the terminal device.

Optionally, before the communication unit 410 reports the measurement result of the first wireless time-frequency resource to the network device, the processing unit is further configured to determine the first wireless time-frequency resource.

Optionally, the processing unit is specifically configured to determine the first wireless time-frequency resource according to a target service.

Optionally, the processing unit is specifically configured to determine the first wireless time-frequency resource according to a period and a time offset of a target service.

Optionally, the processing unit is specifically configured to determine a time position or range of the first wireless time-frequency resource; and/or determine a frequency position or width of the first wireless time-frequency resource; and/or determine a quantity of the first wireless time-frequency resource.

Optionally, before the communication unit 410 reports the measurement result of the first wireless time-frequency resource to the network device, the processing unit is further configured to obtain the measurement result by sensing the second wireless time-frequency resource.

Optionally, before the processing unit obtains the measurement result by sensing the second wireless time-frequency resource, the processing unit is further configured to determine the second wireless time-frequency resource according to second configuration information configured by the network device.

Optionally, the second configuration information is configured to indicate a time position or range of the wireless time-frequency resource to be sensed by the terminal device; and/or is configured to indicate a frequency position or width of a wireless time-frequency resource to be sensed by the terminal device; and/or is configured to indicate a quantity of wireless time-frequency resource to be sensed by the terminal device.

Optionally, the second configuration information is configured to indicate a repetition period for sensing the wireless time-frequency resource by the terminal device; and/or is configured to indicate a repetition number for sensing the wireless time-frequency resource by the terminal device.

Optionally, the second configuration information includes a second index, where the second index is configured to indicate a time position or range of the wireless time-frequency resource to be sensed by the terminal device.

Optionally, before the processing unit senses the second wireless time-frequency resource and obtains the measurement result, the processing unit is further configured to determine a second wireless time-frequency resource.

Optionally, the processing unit is specifically configured to determine the second wireless time-frequency resource according to a target service.

Optionally, the processing unit is specifically configured to determine the second wireless time-frequency resource according to a period and a time offset of the target service.

Optionally, the processing unit is specifically configured to determine a time position or range of the second wireless time-frequency resource; and/or determine a frequency position or width of the second wireless time-frequency resource; and/or determine the number of the second wireless time-frequency resource.

Optionally, the processing unit is specifically configured to determine a time position or range of the second wireless time-frequency resource; and/or determine a repetition period of the second wireless time-frequency resource; and/or determine a repetition number of the second wireless time-frequency resource.

Optionally, the processing unit is specifically configured to periodically sense the second wireless time-frequency resource to obtain the measurement result.

Optionally, the sensing period is configured by the network device.

Optionally, the sensing period is determined by the terminal device.

Optionally, the sensing period being determined by the terminal device includes:

determining the sensing period by the terminal device according to the target service.

Optionally, the processing unit is specifically configured to if the attribute of the service changes, sense the second wireless time-frequency resource to obtain the measurement result.

The change of the attribute of the service includes: a new service is to be transmitted; and/or at least one of a period, a time offset, a packet size, and a priority of an existing service is changed; and/or an existing service ends.

Optionally, the processing unit is specifically configured to if the attribute of the target resource changes, sense the second wireless time-frequency resource to obtain the measurement result.

Optionally, the processing unit is specifically configured to if the network device schedules the terminal device to sense the wireless time-frequency resource, sense the second wireless time-frequency resource to obtain the measurement result.

Optionally, the processing unit is specifically configured to, if a random counter times out, sense the second wireless time-frequency resource by the terminal device to obtain the measurement result.

Optionally, the communication unit 410 is specifically configured to report the measurement result of the first wireless time-frequency resource to the network device periodically.

Optionally, the reporting period is configured by the network device.

Optionally, the reporting period is determined by the terminal device.

Optionally, the reporting period being determined by the terminal device includes determining the reporting period by the terminal device according to the target service.

Optionally, the communication unit 410 is specifically configured to if the attribute of the target resource changes, report the measurement result of the first wireless time-frequency resource to the network device.

Optionally, the target resource is the first wireless time-frequency resource.

Optionally, the target resource is a wireless time-frequency resource sensed by the terminal device when obtaining the measurement report.

Optionally, the change of the attribute of the target resource includes an RSSI of the target resource changes, or an RSRP of the target resource changes, or an RSRQ of the target resource changes, or an occupation of the target resource by another terminal device changes.

Optionally, the change of the attribute of the target resource includes the amount of resources that meet a first quality requirement in the target resource changes.

Optionally, the first quality requirement is the RSSI of the target resource, or the RSRP of the target resource, or the RSRQ of the target resource, or whether the target resource is occupied by another terminal device meets a first threshold.

Optionally, the change of the attribute of the target resource includes the first configuration information changes, where the first configuration information is configured to indicate a time position or range of the wireless time-frequency resource to be reported by the terminal device; and/or is configured to indicate a frequency position or width of the wireless time-frequency resource to be reported by the terminal device; and/or is configured to indicate the number of the wireless time-frequency resources to be reported by the terminal device.

Optionally, the change of the attribute of the target resource includes the second configuration information is changed, and the second configuration information is configured to indicate a time position or range of the wireless time-frequency resource to be sensed by the terminal device; and/or, is configured to indicate a frequency position or width of a wireless time-frequency resource to be sensed by the terminal device; and/or, is configured to indicate a quantity of wireless time-frequency resources to be sensed by the terminal device.

Optionally, the change of the attribute of the target resource includes the second configuration information is changed, and the second configuration information is configured to indicate a repetition period for sensing the wireless time-frequency resource by the terminal device; and/or is configured to indicate a repetition number for sensing the wireless time-frequency resource by the terminal device.

Optionally, the change of the attribute of the target resource includes the network device disables or deactivates a transmission resource that has been configured for the terminal device; or the network device configures a new transmission resource for the terminal device.

Optionally, the terminal device reporting the measurement result of the first wireless time-frequency resource for terminal-to-terminal communication to the network device includes if the network device schedules the terminal device to report the wireless time-frequency resource, the terminal device reporting the measurement result of the first wireless time-frequency resource to the network device.

Optionally, the terminal device reporting the measurement result of the first wireless time-frequency resource for terminal-to-terminal communication to the network device includes if the random counter times out, the terminal device reporting the measurement result of the first wireless time-frequency resource to the network device.

Optionally, the measurement result is carried in at least one of RRC signaling, MAC CE, BSR, and physical uplink control channel.

Optionally, the measurement result includes at least one of the following information about the first time-frequency resource:

time-frequency location information; resource availability information; RSRP information; RSSI information; RSRQ information.

It should be understood that the terminal device 400 may correspond to the terminal device in the method 200 and may implement corresponding operations implemented by the terminal device in the method 200. For brevity, details are not described herein again.

Figure 5:
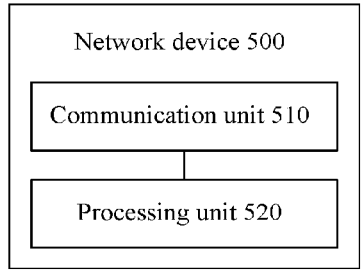
FIG. 5 is a schematic block diagram of a network device according to an embodiment of the present disclosure.

FIG. 5 is a schematic block diagram of a network device 500 according to an embodiment of the present disclosure. The network device 500 includes a communication unit 510 configured to receive a measurement result of a first wireless time-frequency resource for terminal-to-terminal communication reported by a terminal device, where the terminal device is a terminal device supporting a network scheduling a terminal-to-terminal communication resource mode; a processing unit 520 configured to schedule a wireless time-frequency resource of the terminal device for terminal-to-terminal communication according to the measurement result.

Optionally, before the communication unit 510 receives the measurement result reported by the terminal device, the communication unit 510 is further configured to send first configuration information to the terminal device, where the first configuration information is configured to indicate a time position or range of the wireless time-frequency resource to be reported by the terminal device; and/or is configured to indicate a frequency position or width of the wireless time-frequency resource to be reported by the terminal device; and/or is configured to indicate the number of wireless time-frequency resources to be reported by the terminal device.

Optionally, the first configuration information includes a first index, where the first index is configured to indicate a time position or range of the wireless time-frequency resource to be reported by the terminal device.

Optionally, the first wireless time-frequency resource is determined by the terminal device according to a period and a time offset of a target service.

Optionally, the measurement result is obtained by the terminal device by sensing a second wireless time-frequency resource.

Optionally, the second wireless time-frequency resource is determined by the terminal device according to a period and a time offset of a target service.

Optionally, before the communication unit 510 receives the measurement result reported by the terminal device, the communication unit 510 is further configured to send second configuration information to the terminal device, where the second configuration information is configured to indicate the time position or range of the wireless time-frequency resource to be sensed by the terminal device; and/or is configured to indicate a frequency position or width of a wireless time-frequency resource to be sensed by the terminal device; and/or is configured to indicate a quantity of wireless time-frequency resource to be sensed by the terminal device.

Optionally, before the communication unit 510 receives the measurement result reported by the terminal device, the communication unit 510 is further configured to send the second configuration information to the terminal device, where the second configuration information is configured to indicate a repetition period for sensing the wireless time-frequency resource by the terminal device; and/or is configured to indicate a repetition number for sensing the wireless time-frequency resource by the terminal device.

Optionally, the second configuration information includes a second index, where the second index is configured to indicate a time position or range of the wireless time-frequency resource to be sensed by the terminal device.

Optionally, the communication unit 510 is specifically configured to periodically receive the measurement result reported by the terminal device.

Optionally, the reporting period is configured by the network device.

Optionally, the reporting period is determined by the terminal device. Optionally, the reporting period being determined by the terminal device includes determining the reporting period by the terminal device according to the target service.

Optionally, the communication unit 510 is specifically configured to, if the attribute of the service changes, receive the measurement result reported by the terminal device.

The change of the attribute of the service includes a new service is to be transmitted; and/or at least one of a period, a time offset, a packet size, and a priority of an existing service is changed; and/or an existing service ends.

Optionally, the communication unit 510 is specifically configured to if the attribute of the target resource changes, receive the measurement result reported by the terminal device.

Optionally, the target resource is the first wireless time-frequency resource.

Optionally, the target resource is a wireless time-frequency resource sensed by the terminal device when obtaining the measurement report.

Optionally, the change of the attribute of the target resource includes an RSSI of the target resource changes, or an RSRP of the target resource changes, or an RSRQ of the target resource changes, or an occupation of the target resource by another terminal device changes.

Optionally, the change of the attribute of the target resource includes the amount of resources that meet the first quality requirement in the target resource changes.

Optionally, the first quality requirement is the RSSI of the target resource, or the RSRP of the target resource, or the RSRQ of the target resource, or whether the target resource is occupied by another terminal device meets the first threshold.

Optionally, the change of the attribute of the target resource includes the first configuration information changes, where the first configuration information is configured to indicate the time position or range of the wireless time-frequency resource to be reported by the terminal device; and/or is configured to indicate the frequency position or width of the wireless time-frequency resource to be reported by the terminal device; and/or is configured to indicate the number of wireless time-frequency resources to be reported by the terminal device.

Optionally, the change of the attribute of the target resource includes the second configuration information is changed, and the second configuration information is configured to indicate the time position or range of the wireless time-frequency resource to be sensed by the terminal device; and/or is configured to indicate a frequency position or width of a wireless time-frequency resource to be sensed by the terminal device; and/or is configured to indicate a quantity of the wireless time-frequency resources to be sensed by the terminal device.

Optionally, the change of the attribute of the target resource includes the second configuration information is changed, and the second configuration information is configured to indicate a repetition period for sensing the wireless time-frequency resource by the terminal device; and/or is configured to indicate a repetition number for sensing the wireless time-frequency resource by the terminal device.

Optionally, the change of the attribute of the target resource includes the network device disables or deactivates a transmission resource that has been configured for the terminal device; or the network device configures a new transmission resource for the terminal device.

Optionally, the communication unit 510 is specifically configured to if the network device schedules the terminal device to report the wireless time-frequency resource, receive the measurement result reported by the terminal device.

Optionally, the communication unit 510 is specifically configured to if the random counter times out, receive the measurement result reported by the terminal device.

Optionally, the measurement result is carried in at least one of RRC signaling, MAC CE, BSR, and physical uplink control channel.

Optionally, the measurement result includes at least one of the following information about the first time-frequency resource: time-frequency location information; resource availability information; RSRP information; RSSI information; or RSRQ information.

It should be understood that the network device 500 may correspond to the network device in the method 300 and may implement corresponding operations implemented by the network device in the method 300. For brevity, details are not described herein again.

Figure 6:
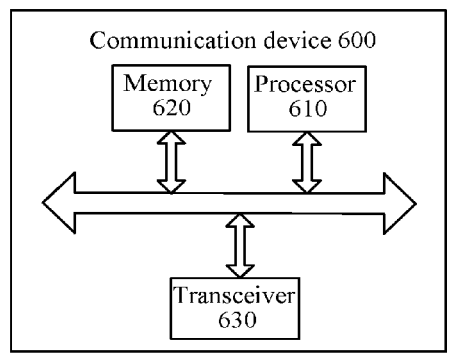
FIG. 6 is a schematic block diagram of a communication device according to an embodiment of the present disclosure.

FIG. 6 is a schematic structural diagram of a communication device 600 according to an embodiment of the present disclosure. The communication device 600 shown in FIG. 8 includes a processor 610, and the processor 610 can call and run a computer program from a memory to implement the method in the embodiments of the present disclosure.

Optionally, as shown in FIG. 6, the communication device 600 may further include a memory 620. The processor 610 may call and run a computer program from the memory 620 to implement the method in the embodiments of the present disclosure.

The memory 620 may be a separate device independent of the processor 610 or may be integrated in the processor 610.

Optionally, as shown in FIG. 6, the communication device 600 may further include a transceiver 630, and the processor 610 may control the transceiver 630 to communicate with other devices, and specifically, may send information or data to other devices, or receive information or data sent by other device.

The transceiver 630 may include a transmitter and a receiver. The transceiver 630 may further include an antenna, and the number of antennas may be one or more.

Optionally, the communication device 600 may specifically be the network device according to the embodiment of the present disclosure, and the communication device 600 may implement the corresponding process implemented by the network device in each method in the embodiments of the present disclosure. For brevity, details are not described herein again.

Optionally, the communication device 600 may specifically be a mobile terminal/terminal device in the embodiments of the present disclosure, and the communication device 600 may implement the corresponding process implemented by the mobile terminal/terminal device in each method in the embodiments of the present disclosure. For brevity, details are not described herein again.

Figure 7:
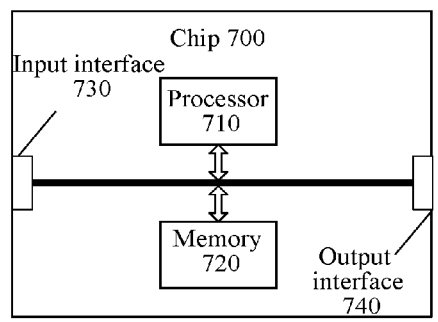
FIG. 7 is a schematic block diagram of a chip according to an embodiment of the present disclosure.

FIG. 7 is a schematic structural diagram of a chip according to an embodiment of the present disclosure. The chip 700 shown in FIG. 7 includes a processor 710, and the processor 710 may call and run a computer program from a memory to implement the method in the embodiments of the present disclosure.

Optionally, as shown in FIG. 7, the chip 700 may further include a memory 720. The processor 710 may call and run a computer program from the memory 720 to implement the method in the embodiments of the present disclosure.

The memory 720 may be a separate device independent of the processor 710 or may be integrated into the processor 710.

Optionally, the chip 700 may further include an input interface 730. The processor 710 may control the input interface 730 to communicate with other devices or chips. Specifically, the processor 710 may obtain information or data sent by other devices or chips.

Optionally, the chip 700 may further include an output interface 740. The processor 710 may control the output interface 740 to communicate with other devices or chips. Specifically, the processor 710 may output information or data to other devices or chips.

Optionally, the chip may be applied to the network device in the embodiments of the present disclosure, and the chip may implement the corresponding process implemented by the network device in each method of the embodiments of the present disclosure. For brevity, details are not described herein again.

Optionally, the chip can be applied to the mobile terminal/terminal device in the embodiments of the present disclosure, and the chip can implement the corresponding process implemented by the mobile terminal/terminal device in each method of the embodiments of the present disclosure. For brevity, details are not described herein again.

It should be understood that the chip mentioned in the embodiments of the present disclosure may also be referred to as a system-level chip, a system chip, a chip system, a system-on-chip, or the like.

Figure 8:
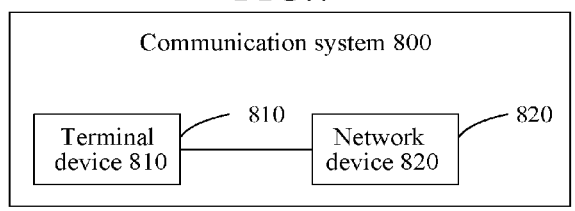
FIG. 8 is a schematic block diagram of a wireless communication system according to an embodiment of the present disclosure.

FIG. 8 is a schematic block diagram of a communication system 800 according to an embodiment of the present disclosure. As shown in FIG. 8, the communication system 800 includes a terminal device 810 and a network device 820.

The terminal device 810 may be configured to implement the corresponding functions implemented by the terminal device in the foregoing method, and the network device 820 may be configured to implement the corresponding functions implemented by the network device in the foregoing method. For brevity, details are not described herein again.

It should be understood that the processor in the embodiments of the present disclosure may be an integrated circuit chip and has a signal processing capability. In the implementation process, each step of the foregoing method embodiments may be completed by using an integrated logic circuit of hardware in a processor or an instruction in a form of software. The above processor may be a general-purpose processor, a digital signal processor (DSP), an application-specific integrated circuit (ASIC), a Field Programmable Gate Array (FPGA), or other programmable logic devices, discrete gate or transistor logic devices, discrete hardware components. Various methods, steps, and logical block diagrams disclosed in the embodiments of the present disclosure may be implemented or executed. The general-purpose processor may be a microprocessor, or the processor may be any processor or the like. The steps of the method disclosed in combination with the embodiments of the present disclosure may be directly implemented by a hardware decoding processor or may be performed by using a combination of hardware and software modules in the decoding processor. The software module may be located in a mature storage medium such as a random-access memory, a flash memory, a read-only memory, a programmable read-only memory, or an electrically erasable programmable memory, a register, and the like. The storage medium is located in the memory, and the processor reads the information in the memory and completes the steps of the above method in combination with its hardware.

It can be understood that the memory in the embodiments of the present disclosure may be a volatile memory or a non-volatile memory or may include both volatile memory and non-volatile memory. The non-volatile memory may be a read-only memory (ROM), a programmable read-only memory (PROM), an erasable programmable read-only memory (Erasable PROM, EPROM), or Electrically EPROM (EEPROM) or flash memory. The volatile memory may be Random Access Memory (RAM), which is used as an external cache. By way of example but not limitation, many forms of RAM are available, such as Static Random Access Memory (SRAM), Dynamic Random Access Memory (DRAM), Synchronous Dynamic Random Access Memory (Synchronous DRAM, SDRAM), double data rate synchronous dynamic random access memory (Double Data Rate SDRAM, DDR SDRAM), enhanced synchronous dynamic random access memory (Enhanced SDRAM, ESDRAM), synchronous connection dynamic random access memory (Synchlink DRAM, SLDRAM) and direct memory bus random access memory (Direct Rambus RAM, DR RAM). It should be noted that the memory of the systems and methods described herein is intended to include, but is not limited to, these and any other suitable types of memory.

It should be understood that the foregoing memory is exemplary but not restrictive. For example, the memory in the embodiments of the present disclosure may also be static random access memory (static RAM, SRAM), dynamic random access memory (dynamic RAM, DRAM), synchronous dynamic random access memory (synchronous DRAM, SDRAM), double data rate synchronous dynamic random access memory (double data rate SDRAM, DDR SDRAM), enhanced synchronous dynamic random access memory (enhanced SDRAM, ESDRAM), synchronous connection dynamic random access memory (synch link DRAM, SLDRAM) and direct memory bus random access memory (Direct Rambus RAM, DR RAM), etc. That is, the memories in the embodiments of the present disclosure are intended to include, but not limited to, these and any other suitable types of memories.

An embodiment of the present disclosure further provides a computer-readable storage medium for storing a computer program.

Optionally, the computer-readable storage medium can be applied to the network device in the embodiments of the present disclosure, and the computer program causes the computer to execute the corresponding process implemented by the network device in each method in the embodiments of the present disclosure. For brevity, details are not repeated herein.

Optionally, the computer-readable storage medium can be applied to the mobile terminal/terminal device in the embodiments of the present disclosure, and the computer program causes the computer to execute the corresponding process implemented by the mobile terminal/terminal device in each method in the embodiments of the present disclosure. For the sake of brevity, details are not repeated herein.

An embodiment of the present disclosure further provides a computer program product, including a computer program instruction.

Optionally, the computer program product can be applied to the network device in the embodiments of the present disclosure, and the computer program instruction causes the computer to execute the corresponding process implemented by the network device in each method in the embodiments of the present disclosure. For the sake of brevity, details are not repeated herein.

Optionally, the computer program product may be applied to the mobile terminal/terminal device in the embodiments of the present disclosure, and the computer program instruction causes the computer to execute the corresponding process implemented by the mobile terminal/terminal device in each method of the embodiments of the present disclosure. For the sake of brevity, details are not repeated herein.

An embodiment of the present disclosure also provides a computer program.

Optionally, the computer program may be applied to the network device in the embodiments of the present disclosure. When the computer program is run on a computer, the computer is caused to execute the corresponding process implemented by the network device in each method in the embodiments of the present disclosure. For the sake of brevity, details are not repeated herein.

Optionally, the computer program can be applied to the mobile terminal/terminal device in the embodiments of the present disclosure, and when the computer program is run on a computer, the computer executes each method in the embodiments of the present disclosure by the mobile terminal/terminal device. For the sake of brevity, details are not repeated herein.

In the above embodiments, it may be implemented in whole or in part by software, hardware, firmware, or any combination thereof. When implemented in software, it may be implemented in whole or in part in the form of a computer program product. The computer program product includes one or more computer instructions. When the computer program instructions are loaded and executed on a computer, the processes or functions according to the embodiments of the present disclosure are wholly or partially generated. The computer may be a general-purpose computer, a special purpose computer, a computer network, or other programmable device. The computer instructions may be stored in a computer-readable storage medium or transmitted from one computer-readable storage medium to another computer-readable storage medium, for example, the computer instructions may be transmitted from a website site, a computer, a server, or a data center through a cable (such as coaxial cable, an optical fiber, a digital subscriber line (DSL)) or wireless (such as infrared, wireless, microwave, etc.) to another website site, computer, server, or data center. The computer-readable storage medium may be any available medium that can be accessed by a computer or a data storage device such as a server, a data center, or the like that includes one or more available medium integration. The available medium may be a magnetic medium (for example, a floppy disk, a hard disk, a magnetic tape), an optical medium (for example, a DVD), or a semiconductor medium (for example, a solid-state disk (SSD)).

It should be understood that, in the various embodiments of the present disclosure, the size of the sequence numbers of the above processes does not mean the order of execution. The execution order of each process should be determined by its function and internal logic and should not constitute any limitation on the implementation process of the embodiments of the present disclosure.

Those skilled in the art can clearly understand that, for the convenience and brevity of description, the specific working processes of the systems, devices, and units described above can refer to the corresponding processes in the foregoing method embodiments, and are not repeated here.

The above is only a specific implementation of the present disclosure, and the scope of protection of the present disclosure is not limited thereto. Any changes or replacements which can be easily thought of by those skilled in the art within the technical scope disclosed in the present disclosure should be covered by the protection scope of the present disclosure. Therefore, the protection scope of the present disclosure shall be subject to the protection scope of the claims.

What is claimed is:

1. A method for reporting a resource, comprising:
obtaining, by a terminal device, first configuration information configured by a network device;
determining, by the terminal device, a first wireless time-frequency resource according to the first configuration information, the first wireless time-frequency resource being used for terminal-to-terminal communication;

obtaining, by the terminal device, second configuration information configured by the network device;

determining, by the terminal device, a second wireless time-frequency resource according to the second configuration information;

obtaining, by the terminal device, a measurement result of the first wireless time-frequency resource by sensing the second wireless time-frequency resource; and reporting, by the terminal device, the measurement result of the first wireless time-frequency resource to the network device, the measurement result comprising resource availability information, wherein the terminal device supports a network scheduled terminal-to-terminal communication resource mode, and wherein a time position or range of the first wireless time-frequency resource to be reported by the terminal device is indicated by a first index.

2. The method according to claim 1, wherein the first configuration information is configured to indicate at least one of:
a time position or range of a wireless time-frequency resource to be reported by the terminal device;
a frequency position or width of the wireless time-frequency resource to be reported by the terminal device; or,
a quantity of the wireless time-frequency resource to be reported by the terminal device.

3. The method according to claim 1, wherein the first configuration information comprises the first index.

4. The method according to claim 1, wherein the method further comprises determining, by the terminal device, the first wireless time-frequency resource according to a target service.

5. The method according to claim 1, wherein the determining, by the terminal device, the first wireless time-frequency resource comprises at least one of:
determining, by the terminal device, a time position or range of the first wireless time-frequency resource;
determining, by the terminal device, a frequency position or width of the first wireless time-frequency resource; or
determining, by the terminal device, a quantity of the first wireless time-frequency resource.

6. The method according to claim 1, wherein the second configuration information is configured to indicate at least one of:
a time position or range of a wireless time-frequency resource to be sensed by the terminal device;
a frequency position or width of the wireless time-frequency resource to be sensed by the terminal device; or
a quantity of the wireless time-frequency resource to be sensed by the terminal device.

7. The method according to claim 1, wherein the determining, by the terminal device, the second wireless time-frequency resource comprises at least one of:
determining, by the terminal device, a time position or range of the second wireless time-frequency resource;
determining, by the terminal device, a frequency position or width of the second wireless time-frequency resource; or
determining, by the terminal device, a quantity of the second wireless time-frequency resource.

8. The method according to claim 1, wherein the reporting, by the terminal device, the measurement result of the first wireless time-frequency resource used for terminal-to-terminal communication to the network device comprises periodically reporting, by the terminal device, the measurement result of the first wireless time-frequency resource to the network device.

9. The method according to claim 1, wherein the measurement result is carried in at least one of a radio resource control (RRC) signaling, a media access control control element (MAC CE), a buffer status report (BSR), or a physical uplink control channel.

10. The method according to claim 1, wherein the measurement result further comprises at least one of following information of the first time-frequency resource: time-frequency location information; RSRP information; RSSI information; or RSRQ information.

11. A terminal device, comprising:
a processor; and
a memory,
wherein the memory is configured to store a computer program, and the processor is configured to call and run the computer program stored in the memory, and execute:
obtaining first configuration information configured by a network device;
determining a first wireless time-frequency resource according to the first configuration information, the first wireless time-frequency resource being used for terminal-to-terminal communication; and
obtaining, by the terminal device, second configuration information configured by the network device;
determining, by the terminal device, a second wireless time-frequency resource according to the second configuration information;
obtaining, by the terminal device, a measurement result of the first wireless time-frequency resource by sensing the second wireless time-frequency resource; and
reporting the measurement result of the first wireless time-frequency resource to the network device, the measurement result comprising resource availability information,
wherein the terminal device supports a network scheduled terminal-to-terminal communication resource mode, and
wherein a time position or range of the first wireless time-frequency resource to be reported by the terminal device is indicated by a first index.

12. The terminal device according to claim 11, wherein the first configuration information is configured to indicate at least one of:
a time position or range of a wireless time-frequency resource to be reported by the terminal device;
a frequency position or width of the wireless time-frequency resource to be reported by the terminal device; or
a quantity of the wireless time-frequency resource to be reported by the terminal device.

13. The terminal device according to claim 11, wherein the first configuration information comprises the first index.

14. The terminal device according to claim 11, wherein the processor is further configured to determine the first wireless time-frequency resource according to a target service.

15. The terminal device according to claim 11, wherein the processor is further configured to perform at least one of:

determining a time position or range of the first wireless time-frequency resource;

determining a frequency position or width of the first wireless time-frequency resource; or determining a quantity of the first wireless time-frequency resource.

16. The terminal device according to claim 11, wherein the second configuration information is configured to indicate at least one of:

a time position or range of a wireless time-frequency resource to be sensed by the terminal device;

a frequency position or width of the wireless time-frequency resource to be sensed by the terminal device; or a quantity of the wireless time-frequency resource to be sensed by the terminal device.

* * * * *